Patented Sept. 20, 1932

1,878,359

UNITED STATES PATENT OFFICE

WALTER ZISCH, OF FRANKFORT-ON-THE-MAIN, GERMANY, ASSIGNOR, BY MESNE ASSIGNMENTS, TO THE ROESSLER & HASSLACHER CHEMICAL COMPANY, OF NEW YORK, N. Y., A CORPORATION OF DELAWARE

PROCESS FOR THE PREPARATION OF PRODUCTS WHICH LIBERATE OXYGEN

No Drawing. Application filed March 25, 1929, Serial No. 349,913, and in Germany March 31, 1928.

The object of this invention is the preparation of products which will give off oxygen, particularly those which are suitable for use as absorptive or exchanging masses in breathing apparatus whereby the impurities such as carbon dioxide and moisture are absorbed and exchanged for gaseous oxygen.

In German Patent 305,066 it is shown that one can obtain such absorptive masses by making an intimate mixture of anhydrous sodium peroxide with substances containing water of crystallization and heating the mixture. The amounts of substance mixed with the peroxide are such that their water of crystallization is less than one-half mole per mole of peroxide in the mixture. In the same patent it is shown that one can use, as the substance containing the water of crystallization, the hydrate of sodium peroxide having the formula $Na_2O_2 \cdot 8H_2O$. The explanation of the reaction, as given in the patent, is that the di-hydrate of sodium peroxide is apparently formed.

I have now found that one can prepare masses having extraordinary activity in purifying and renewing air which is being breathed, by reacting the di-hydrate of an alkali metal peroxide, such as sodium peroxide di-hydrate of the formula $Na_2O_2 \cdot 2H_2O$ with anhydrous alkali metal peroxide.

In the preparation of my absorptive masses, I can make an intimate mixture of anhydrous alkali metal peroxide with such quantities of peroxide di-hydrate that there is present about one-third to one mole of water of crystallization per mole of the anhydrous alkali metal peroxide used in making up the mixture. After the two constituents have been thoroughly mixed together they are converted to the desired product by heating. The mixing of the materials before heating may be accompanied by milling as in a ball mill. In many cases, the reaction begins as the result of local heating whereupon it spreads throughout the mixture. In order to obtain the di-hydrate one can use the known methods. One can mix the octa-hydrate, $Na_2O_2 \cdot 8H_2O$, with the proper quantity of anhydrous peroxide, whereby the di-hydrate forms spontaneously with production of heat merely upon mixing. Preferably, one mixes the anhydrous peroxide into the octa-hydrate gradually with stirring and, if necessary, while cooling the mass. The di-hydrate so obtained can then be used at once for the preparation of my absorptive masses.

*Example I*

234 parts by weight of finely divided anhydrous sodium peroxide were gradually added with stirring to 222 parts of sodium peroxide octa-hydrate. The temperature of the mixture was kept moderately low by cooling. As soon as the heat of the reaction had subsided, 114 parts by weight of the di-hydrate produced during the reaction was mixed thoroughly with 200 parts of anhydrous peroxide. After mixing, the mass was then heated to about 80°–100° C.

One way in which I convert a peroxide, by means of the water introduced with the di-hydrate, into a form suitable for use in breathing apparatus, is to produce molded shapes or masses by applying pressure to the intimate mixture of anhydrous alkali metal peroxide and peroxide di-hydrate and heating the bodies so formed. The shaped bodies or pieces can be thus produced and used directly in breathing apparatus. Large briquettes, plates or tiles of the material can be worked up, as by filing and disintegrating, to make grains of the size most desirable for use. In the process of shifting out grains of the desired size, certain quantities of "fines" will be produced. These can be made use of by mixing them with an unheated mixture of anhydrous peroxide and peroxide di-hydrate and then heating or molding the resulting mixture, whereupon the porosity of the product is increased and its oxygen evolving efficiency in breathing apparatus is improved.

*Example II*

114 parts by weight of sodium peroxide di-hydrate were finely milled and very intimately mixed in a ball mill. To this mixture was added about 20% of its weight of "fines" produced in a previous operation. This final mixture was then molded under pressure in a briquetting apparatus. The molded pieces were then heated to 120° C. and kept at this temperature for a long time. The most suitable temperature and length of time for heating are best determined by preliminary tests. The molded pieces produced by following this example are very hard and may be used as such, or may be broken up into pieces and screened to any desired size and then used in breathing apparatus.

I have found that catalysts favoring the liberation of oxygen from the finished products may be incorporated into the materials at any step in my above described process. Such catalysts are finely divided metals like iron, manganese, cobalt, copper and the like or their oxides.

An advantage in using a peroxide di-hydrate to introduce water into anhydrous peroxide is that the oxygen loss during the manufacture of the absorptive mass is considerably less than by any other method.

What I claim is:

1. Process for the preparation of products which liberate oxygen in contact with breathed air, comprising intimately mixing and then reacting anhydrous alkali metal peroxide with a di-hydrate of an alkali metal peroxide.

2. Process for the preparation of products which liberate oxygen in contact with breathed air, comprising reacting anhydrous alkali metal peroxide intimately mixed with a di-hydrate of an alkali metal peroxide in such proportions that for each mole of said peroxide, there is present in the reaction about one-third to one mole of water of crystallization of said di-hydrate.

3. Process for the preparation of products which liberate oxygen in contact with breathed air, comprising reacting anhydrous sodium peroxide intimately mixed with the dihydrate of sodium peroxide in such proportions that for each mole of anhydrous peroxide, there is present in the reaction about one-third to one mole of water of crystallization of said di-hydrate.

4. Process for the preparation of products which liberate oxygen in contact with breathed air, comprising reacting anhydrous alkali metal peroxide intimately mixed with a di-hydrate of an alkali metal peroxide in such proportions that for each mole of said peroxide, there is present in the reaction about one-third to one mole of water of crystallization of said di-hydrate, and subjecting the reaction product to a heat treatment.

5. Process for the preparation of products which liberate oxygen in contact with breathed air, comprising making an intimate mixture of anhydrous alkali metal peroxide with a di-hydrate of an alkali metal peroxide, molding said mixture under pressure and heating the molded product.

6. Process for the preparation of products which liberate oxygen in contact with breathed air, comprising making an intimate mixture of anhydrous alkali metal peroxide with a di-hydrate of an alkali metal peroxide, molding said mixture under pressure, heating the molded product until hard and then granulating.

7. Process for the preparation of products which liberate oxygen in contact with breathed air, comprising making an intimate mixture of anhydrous alkali metal peroxide with a di-hydrate of an alkali metal peroxide, molding said mixture under pressure, heating the molded product until hard, granulating the hard product, mixing the fines of the granulating step with further quantities of said hydrated product and heating the mixture.

8. A composition of matter comprising an intimate heat treated mixture of a peroxide decomposing catalyst, an alkali metal peroxide and an alkali metal peroxide dihydrate, the ratio of said peroxide and dihydrate being about 1 mole peroxide to between about $1/6$ to $1/2$ mole of dihydrate.

9. A composition of matter comprising an intimate heat treated mixture of small amounts of a finely divided catalyst from the group comprising iron, manganese, cobalt, copper and their oxides with sodium peroxide and its dihydrate, in a ratio of about 1 mole of the former to about $1/2$ to $1/6$ mole of the latter.

Signed at Frankfort A.-M., Germany, this 6th day of March, A. D. 1929.

WALTER ZISCH.